(12) United States Patent
Shimura

(10) Patent No.: US 7,370,522 B2
(45) Date of Patent: May 13, 2008

(54) SENSOR SYSTEM FOR TIRE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 2 days.

(21) Appl. No.: 10/546,811

(22) PCT Filed: Mar. 24, 2004

(86) PCT No.: PCT/JP2004/004124

§ 371 (c)(1),
(2), (4) Date: Aug. 24, 2005

(87) PCT Pub. No.: WO2004/087440

PCT Pub. Date: Oct. 14, 2004

(65) Prior Publication Data
US 2006/0196257 A1   Sep. 7, 2006

(30) Foreign Application Priority Data
Mar. 31, 2003   (JP) .............................. 2003-094884

(51) Int. Cl.
E01C 23/00  (2006.01)
(52) U.S. Cl. ........................................................ 73/146
(58) Field of Classification Search ....... 73/146–146.8; 340/440–447
See application file for complete search history.

(56) References Cited

U.S. PATENT DOCUMENTS

| 4,679,336 A | * | 7/1987 | Brocklebank et al. ......... 37/443 |
| 5,287,626 A | * | 2/1994 | Reich ........................... 33/1 N |
| 5,620,286 A | * | 4/1997 | Youden ...................... 409/157 |
| 6,269,688 B1 | * | 8/2001 | Kroll et al. .................... 73/146 |
| 6,448,977 B1 | * | 9/2002 | Braun et al. .................. 715/701 |
| 6,504,610 B1 | * | 1/2003 | Bauer et al. ................. 356/399 |
| 6,931,920 B2 | * | 8/2005 | Modawell et al. ............. 73/146 |
| 2002/0171537 A1 | * | 11/2002 | Ghabra et al. .............. 340/426 |

FOREIGN PATENT DOCUMENTS

| JP | 5-93562 A | 4/1993 |
| JP | 5-99543 A | 4/1993 |
| JP | 5-169931 A | 7/1993 |
| JP | 10-504783 A | 5/1998 |
| JP | 10-217731 A | 8/1998 |
| JP | 10-315720 A | 12/1998 |

* cited by examiner

Primary Examiner—Jewel Thompson
(74) Attorney, Agent, or Firm—Greer, Burns & Crain, Ltd.

(57) ABSTRACT

A sensor system for a tire, which enables the installation condition of a sensor unit in a tire's air chamber to be know. A sensor system where a sensor unit is installed in a tire's air chamber has detecting means for detecting a relative change in the distance between the sensor unit and a position where the sensor unit is installed.

5 Claims, 2 Drawing Sheets

US 7,370,522 B2

SENSOR SYSTEM FOR TIRE

TECHNICAL FIELD

The present invention relates to a sensor system for a tire, which detects information inside the tire such as an air pressure and a temperature, and more particularly relates to a sensor system for a tire which enables an installation condition of a sensor unit in a tire's air chamber to be known.

BACKGROUND ART

In order to monitor information inside a tire, such as an air pressure and a temperature, there has been heretofore performed attachment of a sensor unit to an inner surface of the tire, a well part of a rim or the like, detection of the information inside the tire by use of the sensor unit, and transmission of the detection results to a receiver outside the tire by utilizing radio waves (for example, see Japanese patent application Kohyo publication No. Hei 10(1998)-504783).

In such a sensor system for a tire, a sensor unit is installed in a tire's air chamber. Thus, there is a drawback that, even if the sensor unit falls off a predetermined installation position, the falling of the sensor unit cannot be known. If a vehicle runs while the sensor unit has fallen off, an electronic component of the sensor unit will be destroyed, and communication may be disabled or a false alarm may be given.

SUMMARY OF THE INVENTION

It is an object of the present invention to provide a sensor system for a tire which enables an installation condition of a sensor unit in a tire's air chamber to be known.

A sensor system for a tire of the present invention to achieve the foregoing object is a sensor system for a tire, in which a sensor unit is installed in a tire's air chamber, including detecting means for detecting a relative change in a distance between the sensor unit and a position where the sensor unit should be installed.

As described above, by providing the detecting means for detecting the relative change in the distance between the sensor unit and the position where the sensor unit should be installed, if the sensor unit falls off a predetermined installation position, the falling of the sensor unit can be easily known. Therefore, destruction of an electronic component, disabled communication, a false alarm, and the like attributable to the falling of the sensor unit can be prevented.

In the present invention, in order to detect the relative change in the distance between the sensor unit and its installation position, the following structure can be adopted.

Specifically, a sensor system for a tire of the present invention is a sensor system for a tire, in which a sensor unit is installed in a tire's air chamber, including: a base which fixes the sensor unit in its installation position, the base being attached to the sensor unit; a conductive path with a pair of contact points formed in the base, the conductive path connecting the contact points thereof; and a detection circuit with a pair of contact points formed in the sensor unit, the detection circuit connecting the contact points thereof, and the contact points being arranged corresponding to positions of the contact points in the base. In the system, a relative change in a distance between the sensor unit and its installation position is detected based on an open and closed state of the detection circuit.

Moreover, a sensor system for a tire of the present invention is a sensor system for a tire, in which a sensor unit is installed in a tire's air chamber, including a proximity sensor which reacts to metal, the proximity sensor being arranged in the sensor unit. In the system, a relative change in a distance between the sensor unit and its installation position is detected based on an output of the proximity sensor.

Furthermore, a sensor system for a tire of the present invention is a sensor system for a tire, in which a sensor unit is installed in a tire's air chamber, including, a probing member which is elastically energized toward an installation position of the sensor unit, the probing member being arranged in the sensor unit. In the system, a relative change in a distance between the sensor unit and its installation position is detected based on displacement of the probing member.

Furthermore, a sensor system for a tire of the present invention is a sensor system for a tire, in which a sensor unit is installed in a tire's air chamber, including a passive transponder mounted in the sensor unit. In the system, a relative change in a distance between the sensor unit and its installation position is detected based on a response of the passive transponder to a reader having a limited output.

In the present invention, the sensor unit includes an electronic component required to detect information inside the tire, the component being housed in a case. The electronic component which constitutes the sensor unit, and structure of the case, are not particularly limited.

DESCRIPTION OF THE PREFERRED EMBODIMENTS

With reference to the accompanying drawings, a configuration of the present invention will be described in detail below.

Figure 1:
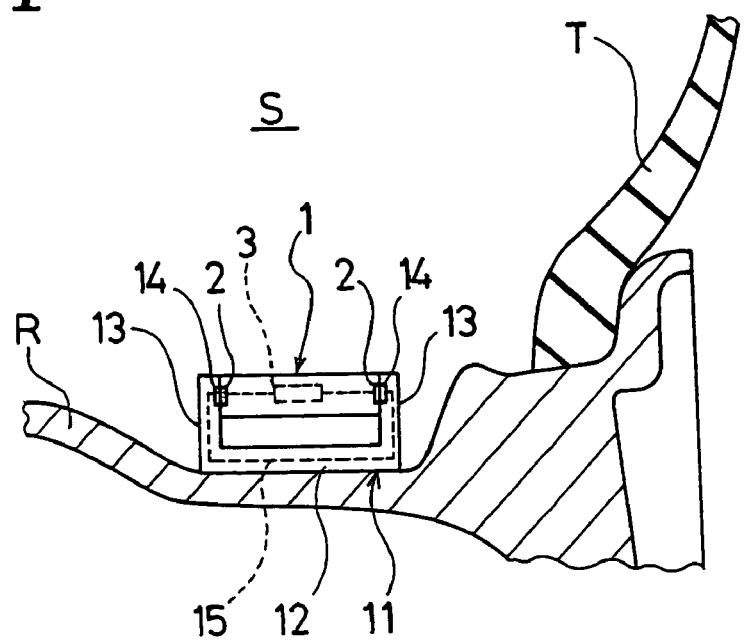
FIG. 1 is a cross-sectional view schematically showing a sensor system for a tire according to a first embodiment of the present invention.

FIG. 1 shows a sensor system for a tire according to a first embodiment of the present invention. In FIG. 1, R denotes a rim, T denotes a tire, and S denotes a tire's air chamber. The sensor system for a tire of this embodiment includes a sensor unit 1 for detecting information inside the tire, and a base 11 for fixing the sensor unit 1. The sensor unit 1 is installed in the tire's air chamber by means of the base 11.

The sensor unit 1 includes an electronic component in a case, measures an air pressure of the tire and an internal temperature thereof, and transmits the measurement results to the outside of the tire. The base 11 includes at least a pair of locking parts 13 and 13 which are protruded from a bottom part 12. These locking parts 13 and 13 lock the sensor unit 1 by sandwiching the unit. The bottom part 12 of the base 11 is fixed to an outer peripheral surface of the rim R, for example. Specifically, the sensor unit 1 is attachable to and detachable from the base 11 fixed to the outer peripheral surface of the rim R.

In the above-described sensor system for a tire, a pair of contact points 14 and 14 are provided at portions of the base 11 where the base comes into contact with the sensor unit 1. Moreover, in the base 11, a conductive path 15 is formed, which electrically connects the pair of contact points 14 and 14 to each other. Meanwhile, a pair of contact points 2 and 2 are provided at portions of the sensor unit 1 where the unit comes into contact with the base 11. Moreover, in the sensor unit 1, a detection circuit 3 is formed, which electrically connects the pair of contact points 2 and 2 to each other. This detection circuit 3 is formed in the electronic component of the sensor unit 1.

In the thus configured sensor system for a tire, when the sensor unit 1 is attached to the base 11, the detection circuit 3 is set in a closed state. On the other hand, if the sensor unit 1 becomes detached from the base 11 or moves out from a predetermined locking position on the base 11 in assembly of the rim and the like, the detection circuit 3 is set in an open state. Therefore, based on the open or closed state of the detection circuit 3, a relative change in a distance between the sensor unit 1 and a position where the sensor unit should be installed is detected. Thus, an installation condition of the sensor unit 1 can be known.

Figure 2:
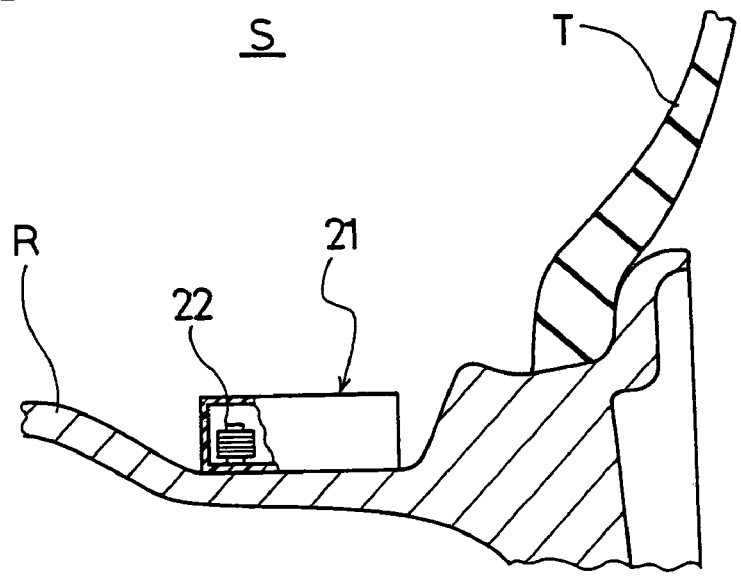
FIG. 2 is a cross-sectional view schematically showing a sensor system for a tire according to a second embodiment of the present invention.

FIG. 2 shows a sensor system for a tire according to a second embodiment of the present invention. In FIG. 2, R denotes a rim, T denotes a tire, and S denotes a tire's air chamber. The sensor system for a tire of this embodiment includes a sensor unit 21 for detecting information inside the tire. The sensor unit 21 is installed in the tire's air chamber. The sensor unit 21 includes an electronic component in a case, measures an air pressure of the tire and an internal temperature thereof, and transmits the measurement results to the outside of the tire.

In the above-described sensor system for a tire, an eddy-current type proximity sensor 22 which reacts to metal is provided in the sensor unit 21. This proximity sensor 22 is disposed so as to face a position where the sensor unit 21 is installed, and generates an output according to a mass of and a distance from a metal member existing in the position. For example, if the sensor unit 21 is attached to an outer peripheral surface of the rim R, the proximity sensor 22 can be configured as described below. Sensitivity of the proximity sensor 22 is controlled so as to react to the rim R made of metal, and, when the proximity sensor 22 comes off the rim R, the sensor no longer reacts to the rim. Moreover, if the sensor unit 21 is attached to an inner surface of the tire, the proximity sensor 22 can be also configured as described below. The sensitivity of the proximity sensor 22 is controlled so as to react to a steel wire embedded inside the tire, and, when the proximity sensor 22 comes off the tire, the sensor no longer reacts to the steel wire. In other words, the proximity sensor 22 is used as a switch. Alternatively, an output of the proximity sensor 22 when the sensor unit 21 is installed in a normal position is stored, and a relative change in a distance between the sensor unit 21 and its installation position may be detected based on a change in the output.

In the thus configured sensor system for a tire, when the sensor unit 21 is installed in a predetermined position, the proximity sensor 22 generates a predetermined output. Meanwhile, if the sensor unit 21 becomes detached from its installation position in assembly of the rim and the like, the output of the proximity sensor 22 changes. Therefore, the relative change in the distance between the sensor unit 21 and its installation position is detected based on the output of the proximity sensor 22. Thus, an installation condition of the sensor unit 21 can be known.

Figure 3:
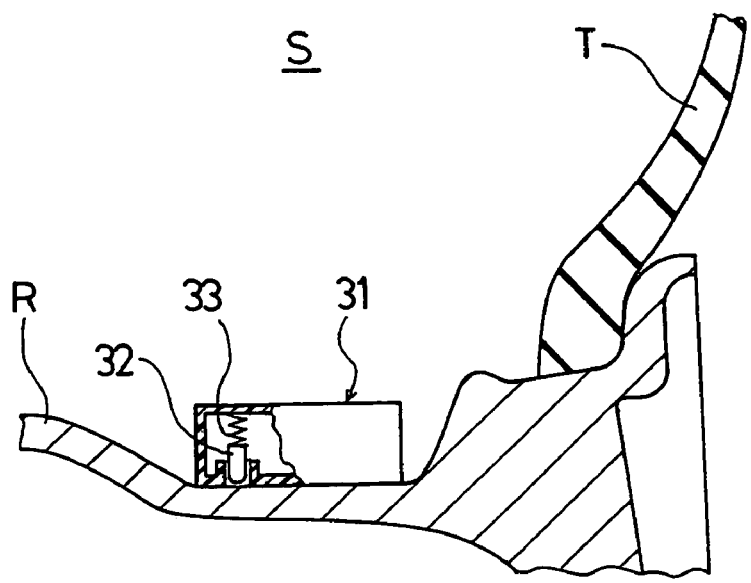
FIG. 3 is a cross-sectional view schematically showing a sensor system for a tire according to a third embodiment of the present invention.

FIG. 3 shows a sensor system for a tire according to a third embodiment of the present invention. In FIG. 3, R denotes a rim, T denotes a tire, and S denotes a tire's air chamber. The sensor system for a tire of this embodiment includes a sensor unit 31 for detecting information inside the tire. The sensor unit 31 is installed in the tire's air chamber. The sensor unit 31 includes an electronic component in a case, measures an air pressure of the tire and an internal temperature thereof, and transmits the measurement results to the outside of the tire.

In the above-described sensor system for a tire, a rod-like probing member 32 which is elastically energized toward an installation position of the sensor unit 31 is provided in the sensor unit 31. Specifically, the probing member 32 can freely come out of or get back into the sensor unit 31 while being energized by an elastic body 33 such as a spring. The sensor unit 31 is installed in a state where the probing member 32 pressed against the installation position is housed in the sensor unit 31. Moreover, in the electronic component of the sensor unit 31, a circuit which is opened or closed according to a position of the probing member 32 is provided.

In the thus configured sensor system for a tire, when the sensor unit 31 is installed in a predetermined position, the probing member 32 is set in a state of being housed in the sensor unit 31. Meanwhile, if the sensor unit 31 becomes detached from its installation position during assembly of the rim and the like, the probing member 32 comes out of the sensor unit 31, and a relative position of the probing member 32 in the sensor unit 31 is changed. Therefore, a relative change in a distance between the sensor unit 31 and its installation position is detected based on displacement of the probing member 32. Thus, an installation condition of the sensor unit 31 can be known.

In the first to third embodiments described above, the installation condition of the sensor unit may be constantly monitored. In such a case, however, too much power is consumed. Thus, it is preferable that detecting means for detecting the relative change in the distance between the sensor unit and its installation position be operated at predetermined time intervals.

A detection result concerning the installation condition of the sensor unit may be transmitted to the outside of the tire by utilizing a transmitter that is included in the electronic component of the sensor unit. In this event, in order to transmit information that the sensor unit is displaced from a predetermined installation position, a code for the predetermined position in a communication protocol may be changed or a protocol signal different from a usual one may be transmitted.

Figure 4:
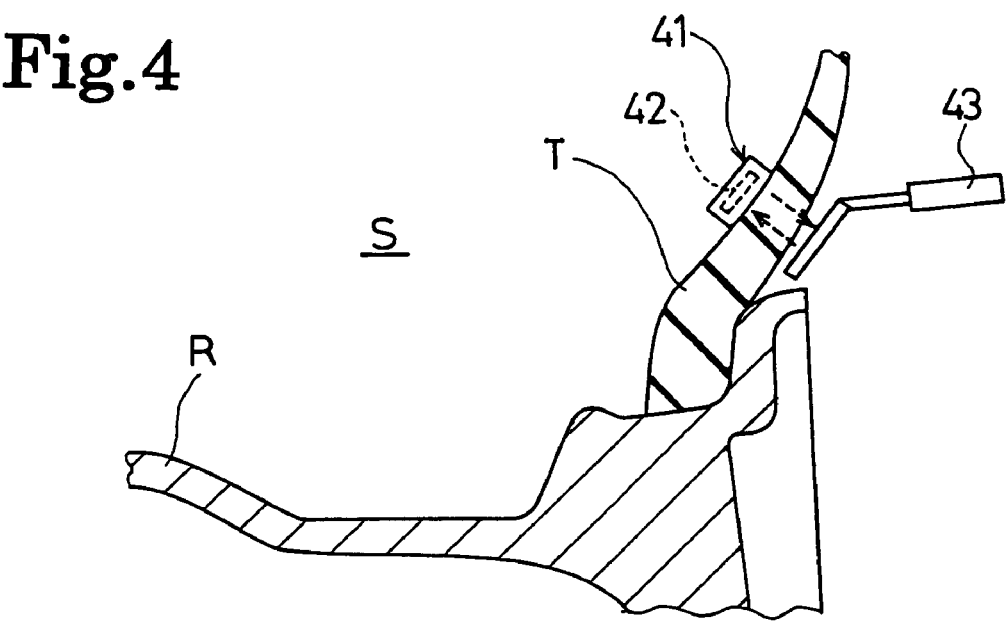
FIG. 4 is a cross-sectional view schematically showing a sensor system for a tire according to a fourth embodiment of the present invention.

FIG. 4 shows a sensor system for a tire according to a fourth embodiment of the present invention. In FIG. 4, R denotes a rim, T denotes a tire, and S denotes a tire's air chamber. The sensor system for a tire of this embodiment includes a sensor unit 41 for detecting information inside the tire. The sensor unit 41 is installed in the tire's air chamber. The sensor unit 41 includes an electronic component in a case, measures an air pressure of the tire and an internal temperature thereof, and transmits the measurement results to the outside of the tire.

In the above-described sensor system for a tire, the sensor unit 41 includes a passive transponder 42. This passive transponder 42 transmits a response signal in response to an inquiry signal from the outside of the tire. The passive transponder 42 may be inserted into the case of the sensor unit 41 as an independent component or may be included in a circuit of the electronic component of the sensor unit 41.

Moreover, in the above-described sensor system for a tire, a reader (scanner) 43 for providing the inquiry signal is simultaneously used. This reader 43 has a limited output. Specifically, an output range of the reader 43 is limited within a 10-cm radius, preferably within a 5-cm radius. Accordingly, if the passive transponder 42 is out of the output range of the reader 43, the response signal cannot be obtained for the inquiry signal.

In the thus configured sensor system for a tire, the sensor unit 41 is installed in a predetermined position on an inner surface of the tire T. For example, the sensor unit 41 is installed behind a specific character displayed on a side face of the tire on an outer side of a vehicle. Accordingly, in a state where the rim is assembled, the reader 43 is brought close to a position where the sensor unit 41 should be installed from the outside of the tire. Thus, the inquiry signal is provided. In this event, the response signal can be obtained if the sensor unit 41 is installed in the predetermined position. The response signal cannot be obtained, however, if the sensor unit 41 does not exist in the predetermined position. Therefore, a relative change in a distance between the sensor unit 41 and its installation position is detected based on a response of the passive transponder 42 to the reader 43 having the limited output. Thus, an installation condition of the sensor unit 41 can be known.

Although the embodiments of the present invention have been described in detail above, it should be understood that various changes, alternatives, and substitutions can be made without departing from the spirit and scope of the present invention, which are defined by the attached claims.

INDUSTRIAL APPLICABILITY

The present invention can be effectively utilized in tire manufacturing industries and thus in automobile manufacturing industries.

What is claimed is:

1. A sensor system for a tire having an air chamber, comprising:
    a sensor unit installed in the air chamber of the tire, and
    detecting means for detecting a relative change in a distance between the sensor unit and a position where the sensor unit is installed.

2. A sensor system for a tire, in which a sensor unit is installed in a tire's air chamber, comprising:
    a base which fixes the sensor unit in its installation position, the base being attached to the sensor unit;
    a conductive path with a pair of contact points formed in the base, the conductive path connecting the contact points thereof; and
    a detection circuit with a pair of contact points formed in the sensor unit, the detection circuit connecting the contact points thereof, and the contact points being arranged corresponding to positions of the contact points in the base,
    wherein a relative change in a distance between the sensor unit and its installation position is detected based on an open and closed state of the detection circuit.

3. A sensor system for a tire, in which a sensor unit is installed in a tires s air chamber, comprising:
    a proximity sensor which reacts to metal, the proximity sensor being arranged in the sensor unit,
    wherein a relative change in a distance between the sensor unit and its installation position is detected based on an output of the proximity sensor.

4. A sensor system for a tire, in which a sensor unit is installed in a tire's air chamber, comprising:
    a probing member which is elastically energized toward an installation position of the sensor unit, the probing member being arranged in the sensor unit,
    wherein a relative change in a distance between the sensor unit and its installation position is detected based on displacement of the probing member.

5. A sensor system for a tire, in which a sensor unit is installed in a tire's air chamber, comprising:
    a passive transponder mounted in the sensor unit,
    wherein a relative change in a distance between the sensor unit and its installation position is detected based on a response of the passive transponder to a reader having a limited output.

* * * * *